(12) United States Patent
Cowley et al.

(10) Patent No.: US 11,985,441 B2
(45) Date of Patent: *May 14, 2024

(54) METHODS AND APPARATUS FOR AN IMAGE SENSOR

(71) Applicant: SEMICONDUCTOR COMPONENTS INDUSTRIES, LLC, Phoenix, AZ (US)

(72) Inventors: Nicholas Paul Cowley, Wroughton (GB); Andrew David Talbot, Chieveley (GB)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,052

(22) Filed: Aug. 19, 2022

(65) Prior Publication Data

US 2022/0408052 A1    Dec. 22, 2022

Related U.S. Application Data

(63) Continuation of application No. 17/249,578, filed on Mar. 5, 2021, now Pat. No. 11,457,166.

(51) Int. Cl.
  *H04N 25/71*  (2023.01)
  *H04N 25/76*  (2023.01)
  *H04N 25/779*  (2023.01)
  *H04N 25/79*  (2023.01)

(52) U.S. Cl.
  CPC ......... *H04N 25/745* (2023.01); *H04N 25/779* (2023.01); *H04N 25/7795* (2023.01); *H04N 25/79* (2023.01)

(58) Field of Classification Search
  CPC .............. H04N 25/745; H04N 25/779; H04N 25/7795; H04N 25/79; H04N 25/74
  See application file for complete search history.

(56) References Cited

U.S. PATENT DOCUMENTS

| | | | |
|---|---|---|---|
| 11,457,166 B1 * | 9/2022 | Cowley | H04N 25/74 |
| 2003/0035059 A1 | 2/2003 | Suzuki | |
| 2005/0018064 A1 | 1/2005 | Itoh et al. | |
| 2005/0259169 A1 | 11/2005 | Ito et al. | |

(Continued)

OTHER PUBLICATIONS

Zhongjie Guo, Ningmei Yu, and Longsheng Wu, A synchronous driving approach based on adaptive delay phase-locked loop for stitching CMOS image sensor, IEICE Electronics Express, 2019, 1-5, vol. 17, No. 3.

*Primary Examiner* — Albert H Cutler
(74) *Attorney, Agent, or Firm* — Treyz Law Group, P.C.; Joseph F. Guihan

(57) ABSTRACT

Various embodiments of the present technology provide a method and apparatus for an image sensor. In various embodiments, the apparatus provides a driver circuit connected to a plurality of electrically distinct pixel groups to provide the pixel groups with a control signal. A delay measurement circuit is connected to the driver circuit and at least one of the pixel groups to measure a time delay of the control signal. A row control circuit is connected to the delay measurement circuit to receive the measured time delay and, in turn, deliver, via the driver circuit, the control signal to all pixel groups in a single row substantially simultaneously.

20 Claims, 8 Drawing Sheets

(56) References Cited

U.S. PATENT DOCUMENTS

| | | |
|---|---|---|
| 2006/0001918 A1 | 1/2006 | Okano et al. |
| 2007/0285518 A1 | 12/2007 | Ikeda |
| 2010/0245647 A1 | 9/2010 | Honda et al. |
| 2012/0099010 A1 | 4/2012 | Sugiyama et al. |
| 2013/0235242 A1 | 9/2013 | Watanabe |
| 2014/0027615 A1 | 1/2014 | Mansoorian et al. |
| 2015/0264286 A1* | 9/2015 | Yamaoka ............... H04N 25/74 348/302 |
| 2016/0021321 A1 | 1/2016 | Kim et al. |
| 2016/0156861 A1 | 6/2016 | Kitani |
| 2016/0211299 A1 | 7/2016 | Arita |
| 2016/0295148 A1 | 10/2016 | Lin et al. |
| 2017/0078597 A1* | 3/2017 | Funaki ................... H04N 25/79 |
| 2021/0112216 A1* | 4/2021 | Choi ....................... H04N 25/40 |
| 2021/0152764 A1* | 5/2021 | Hayashi ................. H04N 23/73 |
| 2022/0179088 A1* | 6/2022 | Sawamoto ........... H04N 25/745 |

* cited by examiner

METHODS AND APPARATUS FOR AN IMAGE SENSOR

BACKGROUND OF THE TECHNOLOGY

Various devices within an integrated circuit may be electrically connected to each other and other areas of the chip with metal wiring (interconnects) to transmit signals from one area of the chip to another. The electrical interconnects, however, introduce signal "time-delays," which are dominated by resistive-capacitive effects (i.e., RC delay). Accordingly, the operation and speed of the integrated circuit may be reduced by the signal delay of the wire and/or other circuits.

In an image sensor, driver circuits are utilized to facilitate transmission of control signals to a pixel array. In conventional image sensors, the driver circuits are positioned in a region lateral to the pixel array. The control signals are transmitted to the edge of the pixel array and then across the pixel array to each pixel. Due to the large area of the pixel array combined with the inherent time-delays of the circuit interconnects, the control signals do not reach all areas of the pixel array at the same time. For example, pixels at and/or near the outer edges of the pixel array will receive the control signal earlier in time than the pixels at and/or near the center of the pixel array. This is especially problematic for an image sensor operation, particularly one performed by a large image sensor (e.g., CMOS) that requires all pixels to be read out in a short period of time.

While conventional methods for reducing signal delays in image sensors involve physically reconstructing interconnects (e.g., increasing their width) or employing various techniques such as clock synchronization and/or addressing rows of the pixel array on a "tile-by-tile" basis, they have not sufficiently addressed the need to reduce signal delays in large array image sensors and, for example, those that employ stitching technology owing to the increased sophistication and complexity of the stitching technology.

SUMMARY OF THE TECHNOLOGY

Various embodiments of the present technology provide a method and apparatus for an image sensor. In various embodiments, the apparatus provides a driver circuit connected to a plurality of electrically distinct pixel groups to provide the pixel groups with a control signal. A delay measurement circuit is connected to the driver circuit and at least one of the pixel groups to measure a time delay of the control signal. A row control circuit is connected to the delay measurement circuit to receive the measured time delay and, in turn, deliver, via the driver circuit, the control signal to all pixel groups in a single row substantially simultaneously.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

DETAILED DESCRIPTION OF EXEMPLARY EMBODIMENTS

The present technology may be described herein in terms of functional block components and various processing steps. Such functional blocks may be realized by any number of components configured to perform the specified functions and achieve the various results. For example, the present technology may employ various amplifiers, circuitry, conductive paths, counters, clock distribution lines, control circuitry, delay measurement circuits, dies, driver circuits, flip-flop circuits, image sensors, pixel arrays, pixel control lines, memory devices, multiplexers, latches, logic circuitry, processors, readout circuitry, row control circuitry, signal control lines, and the like, which may carry out a variety of functions. In addition, the present technology may be practiced in conjunction with any number of systems, such as automotive, aerospace, medical, scientific, surveillance, and consumer electronics, and the system described is merely one exemplary application for the technology. Further, the present technology may employ any number of conventional techniques for capturing image data, generating and transmitting clock signals, generating and transmitting control signals, and the like. In addition, the present technology may be practiced in conjunction with any image sensor operating mode, such as global release mode, global shutter mode, and electronic rolling shutter mode.

Figure 1:
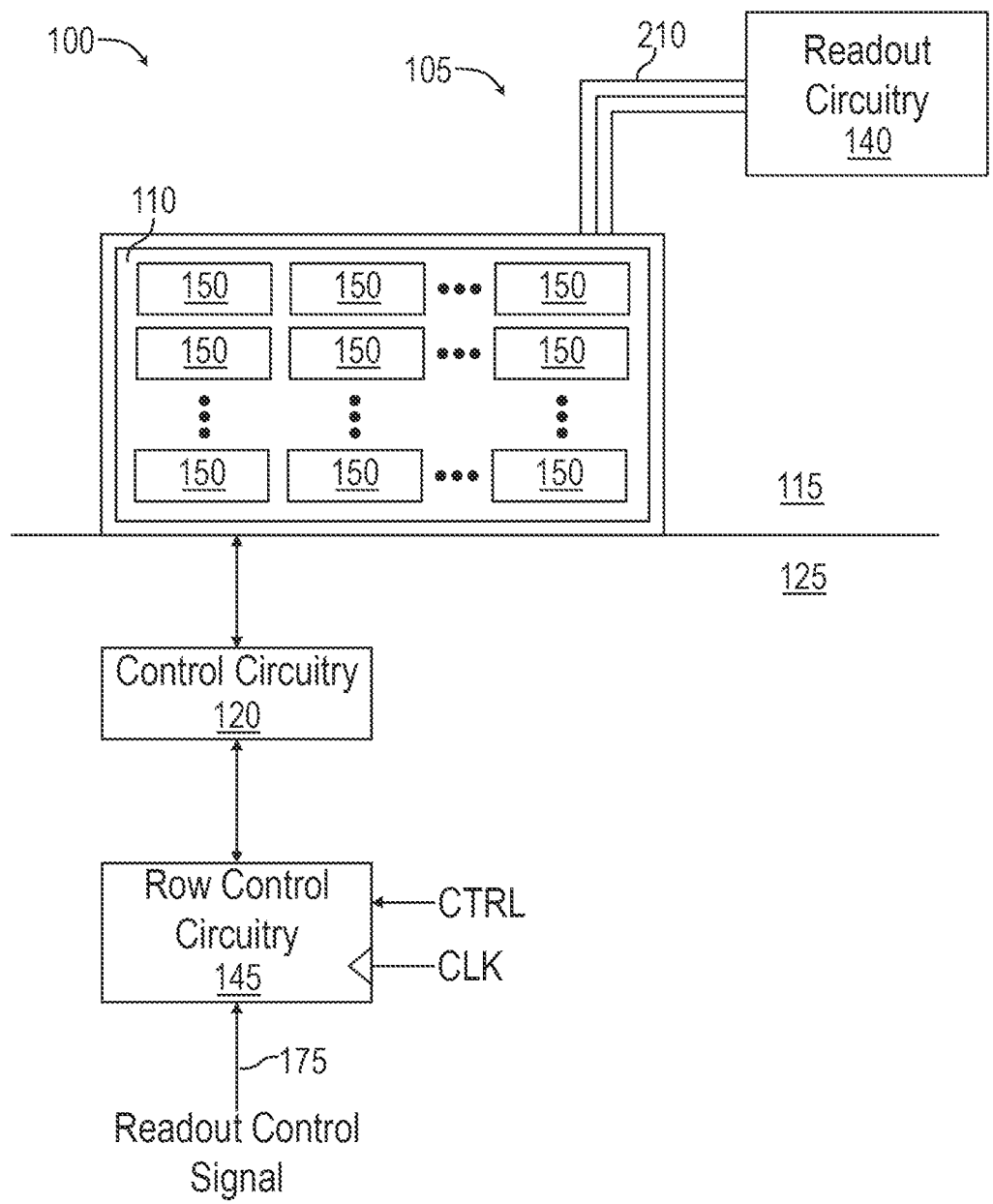
FIG. 1 is a block diagram of a system in accordance with an exemplary embodiment of the present technology.

Methods and apparatus for an image sensor according to various aspects of the present technology may be incorporated into any suitable electronic system and/or device, such as a digital camera, a smartphone, a laptop, imaging devices, portable devices, consumer electronics, and the like. Referring now to FIG. 1, an exemplary image sensor system 100 may be suitably configured to provide more accurately-timed pixel control signals CTRL, such as a readout signal, a reset signal, a transfer signal, and the like, by strategically connecting various components to each other to reduce or eliminate varying signal time delays.

In various embodiments, the image sensor system 100 may comprise an image sensor 105. The image sensor 105 may be implemented in conjunction with any appropriate technology, such as active pixel sensors in complementary metal-oxide-semiconductors (CMOS) and charge-coupled devices. The image sensor 105 may comprise a pixel array 110 formed on a first die 115 and a control circuit 120 formed on a second die 125. The image sensor 105 may be configured to generate the control signals CTRL. The image sensor 105 may also comprise a clock generator (not shown) configured to generate a system clock signal CLK. In various embodiments, the image sensor 105 may further comprise readout circuitry 140.

The image sensor system 100 may further comprise a row control circuit 145, which may operate in conjunction with the control circuit 120 to provide the more accurately-timed pixel control signals CTRL to the pixel array 110.

The pixel array 110 may detect light and convey information that constitutes an image by converting the variable attenuation of light waves (as they pass through or reflect off an object) into electrical signals. The pixel array 110 may contain any number of rows and columns. The pixel array 110 may comprise a plurality of pixels (not shown), and the pixels may be arranged in the rows and columns. For example, the pixel array 110 may be described as an m-by-n array, where m is the number of rows, n is the number of columns, and the number of total pixels is m×n. The location of each individual pixel may be identified by a row number and a column number. Each pixel may comprise any suitable photosensor, such as a photogate, a photodiode, and the like, to detect light and convert the detected light into a charge (i.e., a pixel signal). Each pixel may further comprise various control and readout circuitry, such as one or more transistors, a charge storage region, and a floating diffusion region.

Figure 2:
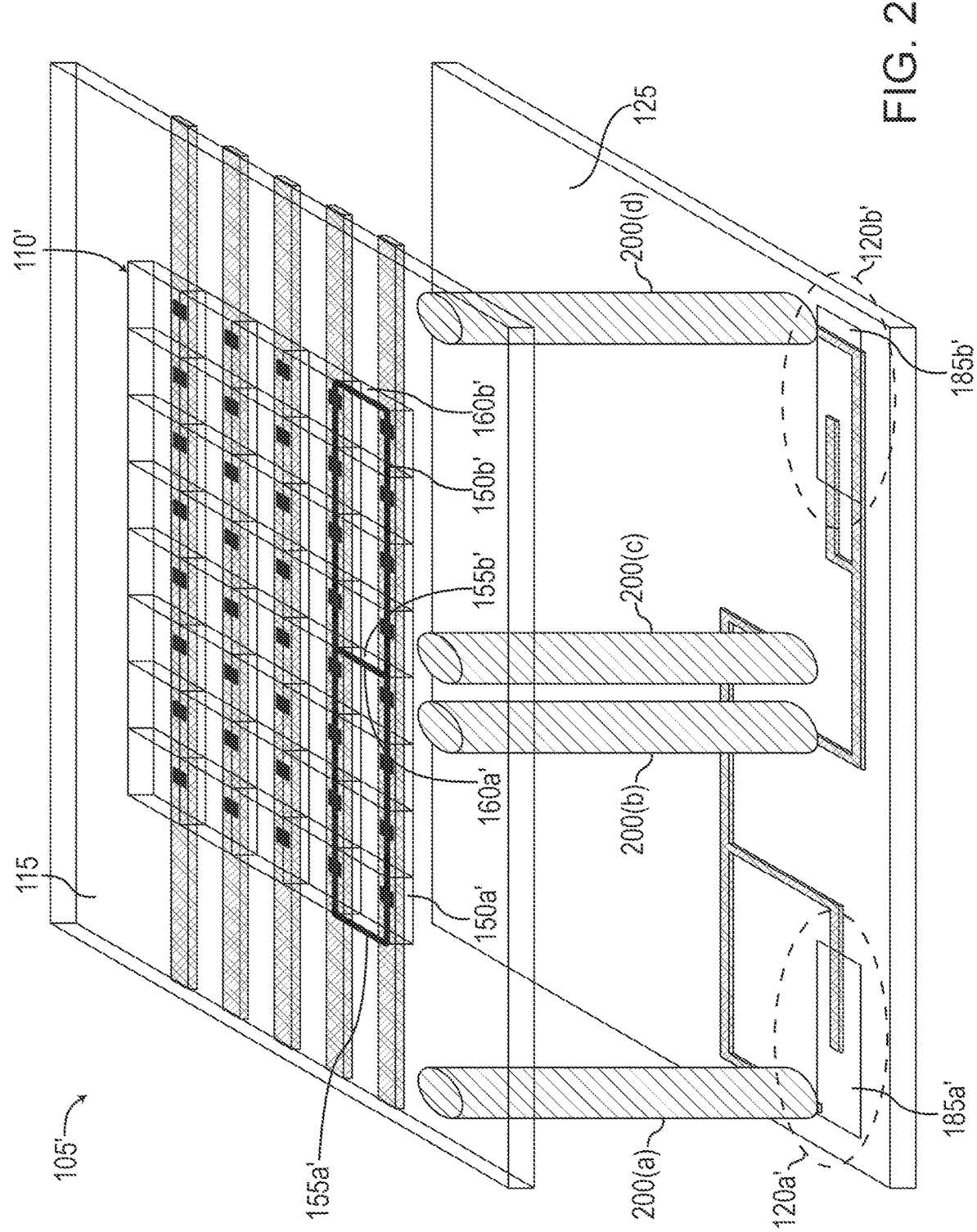
FIG. 2 representatively illustrates an image sensor in accordance with a various embodiments of the present technology.
Figure 3:
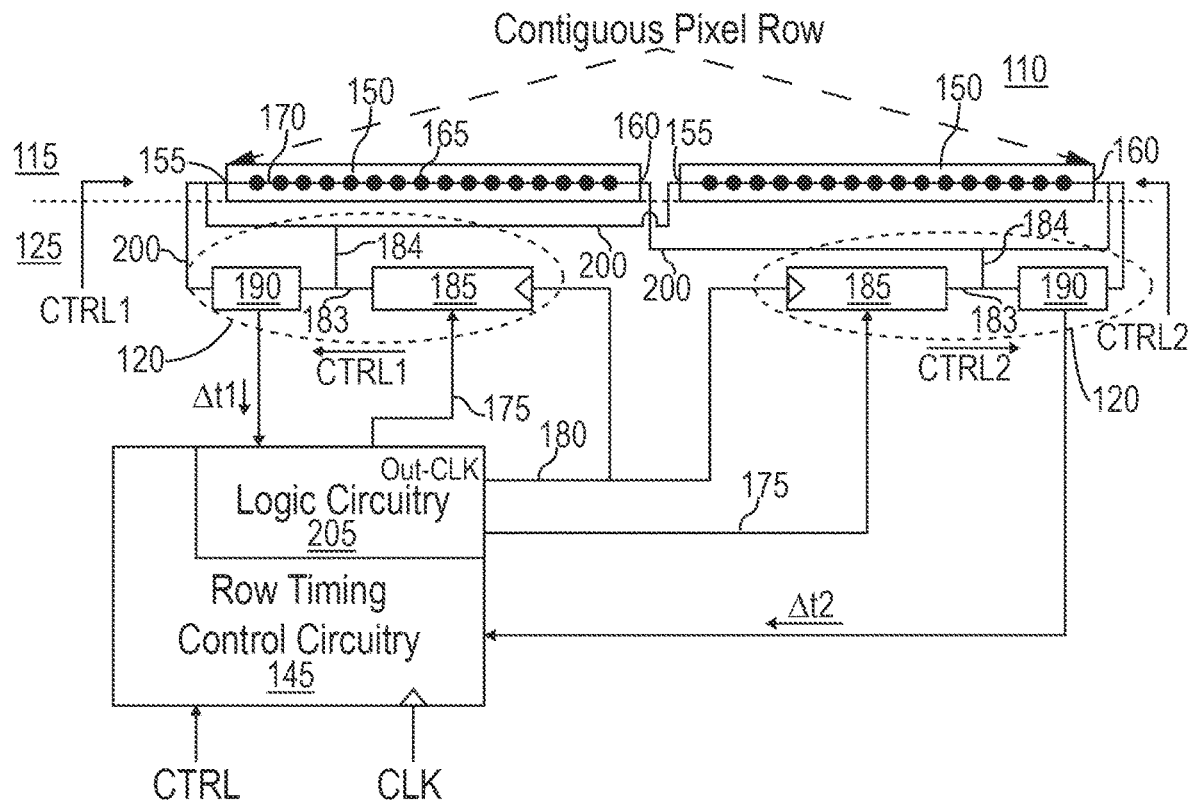
FIG. 3 representatively illustrates a portion of the image sensor in accordance with various embodiments of the present technology.
Figure 4:
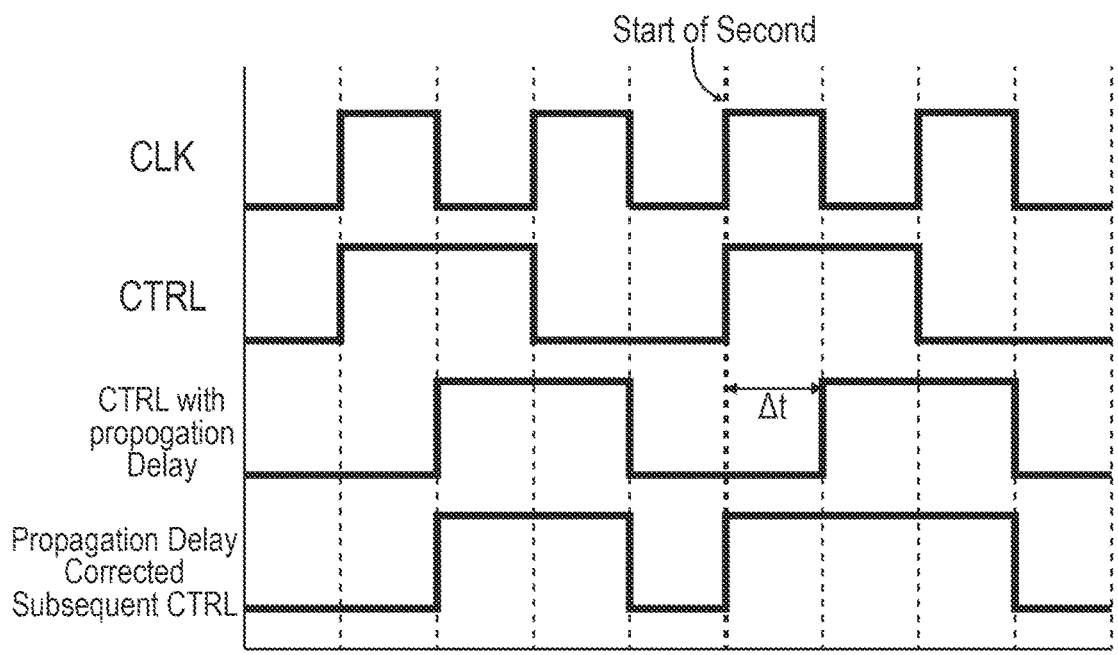
FIG. 4 is a timing diagram of the system in accordance with various embodiments of the present technology.

In an exemplary embodiment, and referring now to FIGS. 1-3, each row of the pixel array 110 may comprise a plurality of pixel groups 150. Each pixel group 150 may comprise a first end 155 and a second end 160 opposite the first end 155. Each pixel group 150 may also comprise a center point 165. The center point 165 of each pixel group 150 may comprise a pixel located substantially at a geometric center of each pixel group 150. Each row of the pixel array 110 may comprise any number of pixel groups 150, and each pixel group 150 may comprise any number of pixels, such as 100, 200, or any suitable number. The pixel array 110 may further comprise a plurality of pixel control lines 170 suitably configured to transmit the control signals CTRL to the pixels in the pixel groups 150. The pixel control lines 170 may comprise any suitable material capable of transmitting an electrical signal, such as metal wiring. The pixels in a particular pixel group 150 may be electrically connected to other pixels within the same pixel group 150 via one of the pixel control lines 170, such that the pixels in the same pixel group 150 receive the same control signal CTRL via one of the pixel control lines 170.

In various embodiments, the pixel groups 150 may be electrically distinct from each other, such that the pixels in each pixel group 150 are electrically connected to other pixels in the same pixel group 150, and the pixels in each pixel group 150 are electrically isolated from pixels in different pixel groups 150 by one or more trenches in the first die 115, such that each pixel group 150 is controlled by a control signal CTRL that is different from the control signal CTRL transmitted to the other pixel groups 150 in a particular row.

In various embodiments, the control circuit 120 may be electrically connected to the pixel array 110 and configured to perform various processing, control, and/or readout operations of the pixels and/or the pixel signals. In various embodiments, the control circuit 120 may be configured to transmit various signals to the pixel array 110 in a manner that ensures that the signals (such as the control signal CTRL) reach each pixel group 150 and/or each pixel in the pixel array 110 substantially simultaneously (e.g., within 1 to 100 ns).

In an exemplary embodiment, the control circuit 120 may be configured to transmit one or more of the control signals CTRL to each pixel group 150 in a respective row substantially simultaneously. The control circuit 120 may be configured to store and transmit data and control a particular row of pixels, a particular pixel group 150, or more than one pixel group 150 in the respective row, and each row of the pixel array 110 may operate according to its own respective control circuit 120. The control circuit 120 may be connected to the row control circuit 145, via a signal control line 175 and a plurality of clock distribution lines 180, and the pixel array 110. The control circuit 120 may comprise any number of components suitable for facilitating the transmission of the control signals CTRL to the pixel array 110. For example, in some embodiments, the control circuit 120 may comprise a plurality of driver circuits 185 and one or more delay measurement circuits 190.

In various embodiments, the control circuit 120 may be positioned below the first die 115. The first and second dies 115, 125 may be situated in separate planes and electrically coupled using any suitable bonding technique and/or electrical interconnects. For example, the first and second dies 115, 125 may be electrically coupled using hybrid bonds or other similar bonding technology, to create one or more electrically conductive paths 200 (e.g., conductive paths 200(a), 200(b), 200(c), 200(d)) from the control circuit 120 to the pixel control lines 170. The electrically conductive paths 200 may connect various regions of the control circuit 120 directly to various ends/regions of the pixel array 110. For example, the control circuit 120 may be connected to the pixel groups 150 via on or more conductive paths 200.

In various embodiments, the first and second dies 115, 125 may be coupled to form a 3D vertical stack, where the pixel array 110 may occupy a first region having a first predetermined area on the first die 115, and the control circuit 120 may occupy a second region having a second predetermined area on the second die 125. In some embodiments, the first predetermined area may be equal to the second predetermined area, and the first and second regions may be aligned. In alternative embodiments, the pixel array 110 and the plurality of driver circuits 185 may occupy a common region on a monolithic die, where each pixel group 150 and each driver circuit 185 may be distributed across the common region.

In some embodiments, the particular arrangement of the control circuit 120 across the region defined by the pixel array 110 may be selected according to a particular application. For example, in one embodiment, the control circuit 120 may be arranged directly below the pixel array 110 or interspersed within the pixel array 110 according to a repeating pattern. In an alternative embodiment, the control circuit 120 may be arranged in slices (i.e., rows) with spacing between adjacent slices. The spacing between adjacent slices may be utilized for other components and/or other functions. In various embodiments, the arrangement of the control circuit 120 may be selected to reduce the time delay of the control signals CTRL transmitted from the control circuit 120 to the pixel groups 150 and/or the pixels that share a common row.

In an exemplary embodiment, the control circuit 120 may comprise one or more driver circuits 185, where each driver circuit 185 may be configured to transmit a respective one of the control signals CTRL to each pixel group 150. In various embodiments, the timing of operation of the driver circuit 185 may be adjusted such that each pixel group 150 sharing a common row in the pixel array 110 receives one or more of the control signals CTRL at substantially the same time.

The driver circuits 185 may be configured to apply a gain to the control signals CTRL and subsequently transmit the control signals CTRL to the pixel array 110. Each driver circuit 185 may comprise any suitable circuit for driving the control signals CTRL, such as a single stage driver amplifier (not shown) or any other suitable amplifier. An output terminal of each driver circuit 185 may be electrically connected to the pixel array 110. For example, each driver circuit 185 may transmit its respective control signal CTRL to each pixel group 150 sharing a common row in the pixel array 110 via the conductive paths 200.

In an exemplary embodiment, one or more of the delay measurement circuits 190 may be suitably configured to measure varying control signal delays in real-time by connecting and/or positioning the one or more delay measurement circuits 190 relative to other components (e.g., the driver circuits 185 and the pixel array 110). For example, a particular delay measurement circuit 190 may be connected to a particular row driver circuit 185 and each pixel group 150 sharing a common row of the pixel array 110, such that the delay measurement circuit 190 may receive the control signal CTRL at a first input and the same control signal CTRL at a later time at a second input.

The first input may be connected to a respective row driver circuit 185 via a first signal line 183, wherein the first signal line 183 may be configured to transmit the control signal CTRL from the driver circuit 185 to the first input. The second input may be connected to at least one particular point (input) of each pixel group 150 via a second signal line 184, wherein the second signal line 184 feeds back, at a later time, the first control signal from the particular pixel group input to the second input. The particular pixel group input may be the first end 155, the second end 160, and/or a center point 165 of the pixel group 150. The delay measurement circuit 190 may count or otherwise measure the time delay between receiving the control signal CTRL at the first input of the delay measurement circuit 190 and receiving the control signal CTRL at the second input of the delay measurement circuit 190.

The measured time delay represents the time delay between a transmission of the control signal CTRL from the driver circuit 185 and a receipt of the control signal CTRL at the pixel group input. The delay measurement circuit 190 may comprise any number of circuits and/or components suitable for measuring a time delay of one or more of the control signals CTRL, such as logic gates (e.g., XNOR gates), multiplexers, flip-flops, latches, counters, and the like. The delay measurement circuit 190 may be further configured to transmit the measured time delay to the row control circuit 145.

In various embodiments, the first signal line 183 may comprise the electrically conductive path 200 that connects the driver circuit 185 to the first input of the delay measurement circuit 190, and the second signal line 184 may comprise the electrically conductive path 200 that connects the input of the pixel group 150 to the second input of the delay measurement circuit 190.

In an exemplary embodiment, and referring now to FIGS. 1 to 4, the row control circuit 145 may be suitably configured to reduce and/or eliminate the varying control signal time delays. For example, in response to receiving the measured time delay from the delay measurement circuit 190, the row control circuit 145 may be configured to adjust the timing of release/transmission of the control signal CTRL to the driver circuit 185 according to the measured time delay.

The row control circuit 145 may comprise logic circuitry 205 responsive to the system clock signal CLK and the measured time delay. For instance, the logic circuitry 205 may be configured to transmit one or more subsequent control signals CTRL to the driver circuits 185 according to the system clock signal CLK and the measured time delay. As an example, the row control circuit 145 may be configured to store/hold a value of the control signal CTRL until a suitable time, such as a subsequent clock pulse (e.g., a rising edge of a subsequent clock pulse) of the system clock signal CLK. The amount of time that the row control circuit 145 stores/holds the control signal CTRL may be predetermined if certain conditions are present. For example, if the measured time delay falls within a particular range of time delay values, then the row control circuit 145 may store/hold the control signal CTRL for a particular number of subsequent clock pulses (e.g., 1, 2, 3, etc. clock pulses).

In various embodiments, the row control circuit 145 may be configured to transmit the subsequent control signal to the driver circuit 185, such that the subsequent control signal is shifted ahead in time with respect to the control signal CTRL by an amount equal to the measured time delay. In this manner, the elapsed time between a leading edge of the subsequent control signal that triggers the row driver circuit 185 to drive the subsequent control signal to the one or more pixel groups 105 and the time at which the same signal edge eventually is input to one of the pixel groups 150 is minimized.

The logic circuitry 205 may comprise any suitable device and/or system for time shifting the control signal CTRL and operating as a memory element. For example, the logic circuitry 205 may comprise a shift register, a flip-flop circuit, a latch circuit, a gated latch circuit, and the like. The logic circuitry 205 may be coupled to the signal control lines 175 and configured to transmit the control signals CTRL to the driver circuits 185 via the signal control lines 175. The signal control lines 175 may comprise metal wiring or other material suitable for transmitting signals.

The clock distribution lines 180 may comprise any suitable arrangement that delivers the system clock signal CLK to the various components. The clock distribution lines 180 may comprise metal wiring or any other suitable material for transmitting the system clock signal CLK.

Referring now to FIG. 1, the readout circuitry 140 may be configured to facilitate readout operations, such as reading out pixel signals from the pixel array 110. For example, the readout circuitry 140 may be electrically connected to the pixel array 110 via a plurality of readout lines 210. The plurality of readout lines 210 may be arranged along the columns of the pixel array 110 and configured to electrically connect each column of the pixel array 110 to the readout circuitry 140 and/or supply a bias signal, such as a bias current or bias voltage.

In various embodiments, the readout circuitry 140 may further comprise various components to process the pixel signals. For example, the readout circuitry 140 may comprise an amplifier circuit (not shown) to amplify each pixel signal and may apply a desired gain to each pixel signal. The readout circuitry 140 may further comprise a sample-and-hold circuit (not shown) for sampling and temporarily storing pixel signals read out from the pixel array 110, an analog-to-digital (ADC) circuit (not shown) to convert the analog pixel signals received from the pixel array 110 into corresponding digital pixel signals, a bias circuit (not shown), a comparator circuit (not shown), memory (not shown), a circuit (not shown) for selectively enabling or disabling the readout circuitry 140, and/or other circuits that are coupled to one or more columns of the pixel array 110.

In light of the foregoing, various embodiments of the present technology will be discussed. Although the pixel array 110 may comprise any number of rows and columns, and each row of the pixel array 110 may comprise any number of pixel groups, for the sake of brevity and simplicity, much of the following discussion is presented in the context of one row and two pixel groups.

Figure 5:
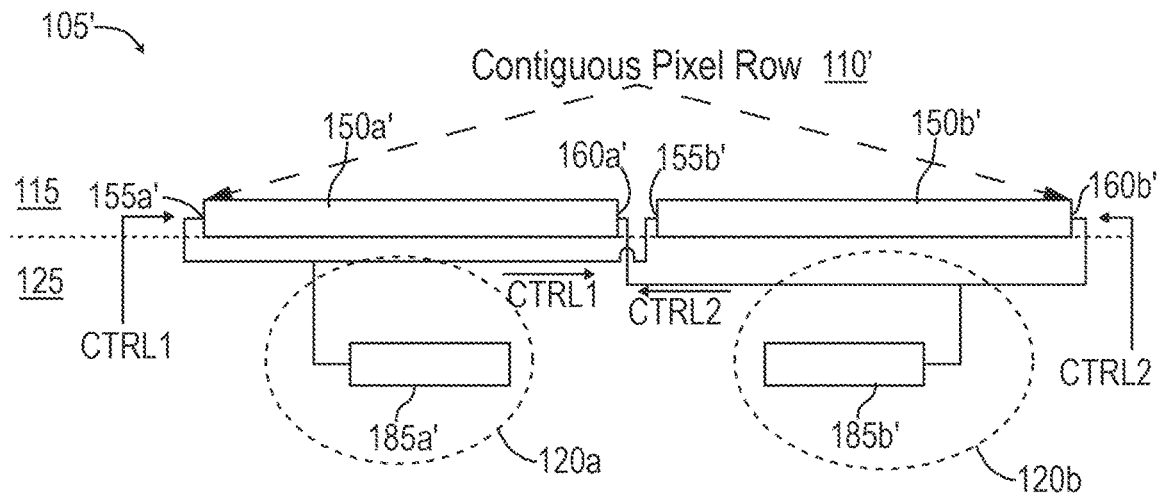
FIG. 5 representatively illustrates a portion of the image sensor in accordance with a first embodiment of the present technology.
Figure 11:
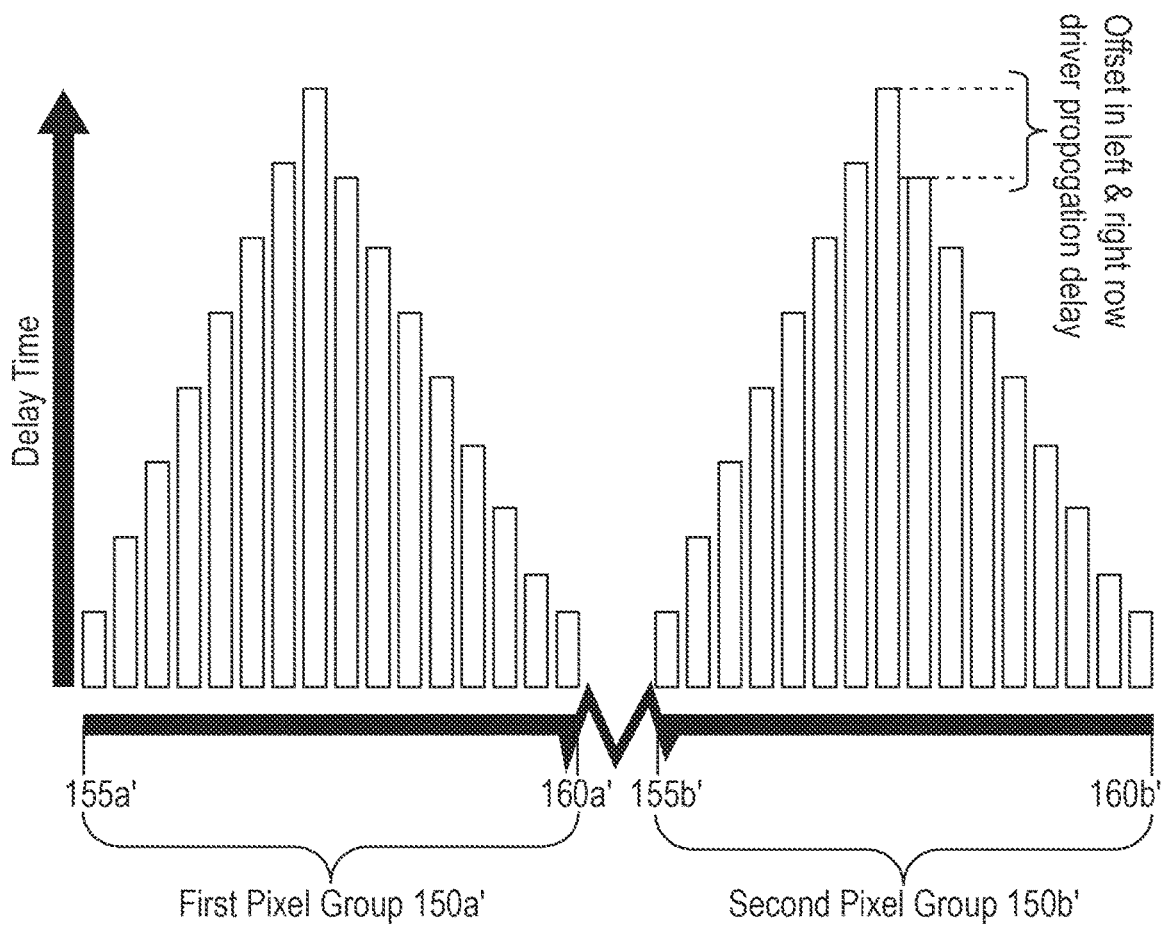
FIG. 11 is a graph showing a time delay of each pixel in the image sensor in accordance with an embodiment of the present technology without offset correction.

According to a first embodiment of the present technology, and now referring to FIGS. 5 and 11, an image sensor 105' may comprise a pixel array 110' comprising a plurality of rows, wherein a first row of the pixel array 110' may comprise a first pixel group 150a' and a second pixel group 150b'. The first pixel group 150a' may comprise a first end 155a' and a second end 160a'. Similarly, the second pixel group 150b' may comprise a first end 155b' and a second end 160b'. The image sensor 105' may also comprise a control circuit 120a' comprising a first driver circuit 185a' and a control circuit 120b' comprising a second driver circuit 185b'.

In one arrangement, the first driver circuit 185a' may be configured to deliver a first control signal CTRL1 to the first end 155a' of the first pixel group 150a' and the first end 155b' of the second pixel group 150b' at substantially the same time. Similarly, the second driver circuit 185b' may be configured to deliver a second control signal CTRL2 to the second end 160a' of the first pixel group 150a' and the second end 160b' of the second pixel group 150b' at substantially the same time. Accordingly, the first control signal CTRL1 propagates in a rightward direction through each pixel group 150a', 150b' and the second control signal CTRL2 propagates in a leftward direction through each pixel group 150a', 150b'.

In an alternative embodiment, the first driver circuit 185a' may be connected to the first and second ends 155a', 160a' of the first pixel group 150a' and the second driver circuit 185b' may be connected to the first and second ends 155b', 160b' of the second pixel group 150b'. In the present embodiment, the first control signal CTRL1 is transmitted exclusively to the first pixel group 150a' and the second control signal CTRL2 is transmitted exclusively to the second pixel group 150b'.

If the first and second driver circuits 185a', 185b' deliver the first and second control signals to each end of the pixel groups 150 substantially simultaneously, the pixels near the center point of each pixel group 150a', 150b' will receive the respective control signal substantially simultaneously. If the driver circuits 185a', 185b' do not deliver the first and second control signals to each end substantially simultaneously, then the timing at which the pixels near the center point receive the respective control signal will be offset from each other (e.g., as illustrated in FIG. 11). As illustrated in FIG. 11, pixels located at a particular distance (rightward) from the first end 155a' of the first pixel group 150a' may receive the first control signal later in time than when pixels located at the same distance (leftward) from the second end 160a' of the first pixel group 150a' may receive the second control signal. Similarly, pixels located at a particular distance (rightward) from the first end 155b' of the second pixel group 150b' may receive the first control signal later in time than when pixels located at the same distance (leftward) from the second end 160b' of the second pixel group 150b' may receive the second control signal. Accordingly, pixels closer to the center of each pixel group 150a', 150b' may receive the first control signal later in time than the second control signal.

The timing of each driver circuit 185a', 185b' may be adjusted in any suitable manner, such as by incorporating, in the form of an offset value, a predetermined "worst case" time delay into timing "files" (e.g., instructions stored in a memory) associated each driver circuit 185a', 185b'. The "worst case" time delay may correspond to the time delay between the transmission of each control signal from their respective driver circuits 185a', 185b' and the receipt of each control signal by the pixel groups 150a', 150b'.

Figure 6:
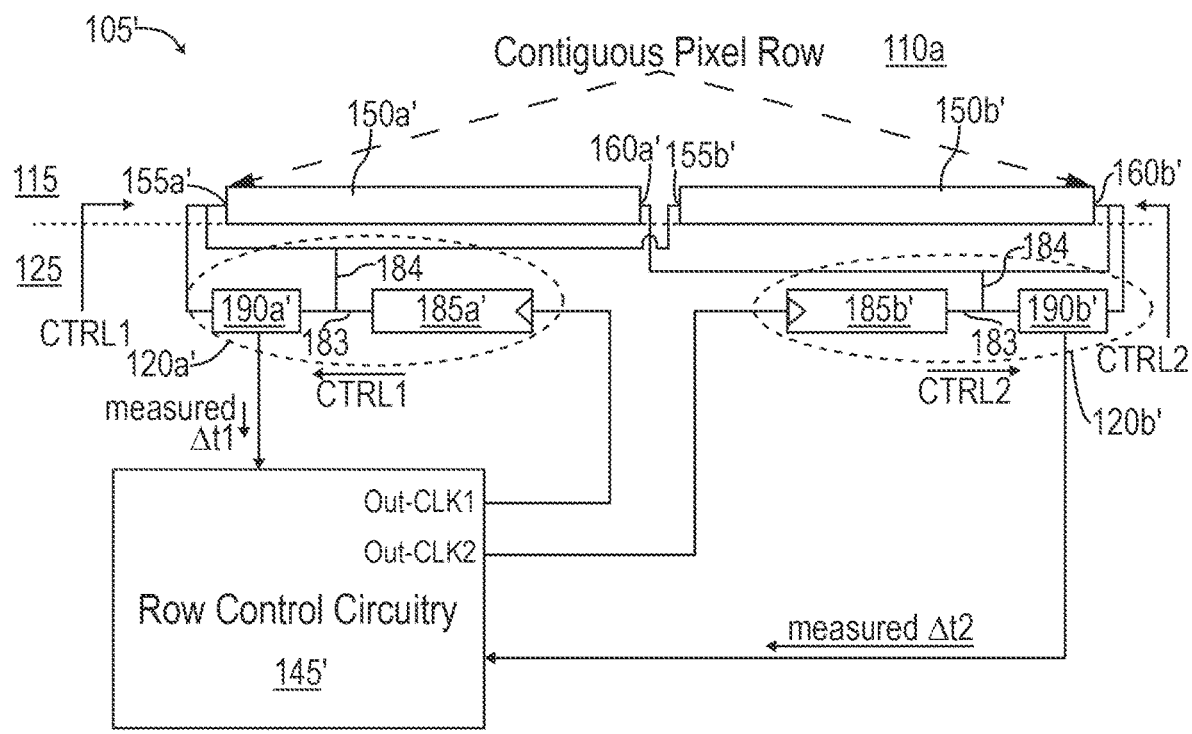
FIG. 6 representatively illustrates a portion of the image sensor in accordance with a second embodiment of the present technology.

According to a second embodiment of the present technology, following the previous example and now referring to FIG. 6, the control circuit 120a' may further comprise a first delay measurement circuit 190a' and the control circuit 120b' may further comprise a second delay measurement circuit 190b'. The first delay measurement circuit 190a' may be coupled to the first driver circuit 185a' and the first ends 155a', 155b' of the first and second pixel groups 150a', 150b', respectively. The second delay measurement circuit 190b' may be coupled to the second row driver circuit 185b' and the second ends 160a', 160b' of the first and second pixel groups 150a', 150b', respectively.

The first delay measurement circuit 190a' may be responsive to the first control signal CTRL1. For example, the first delay measurement circuit 190a' may be configured to measure a first time delay $\Delta t1$, wherein the first time delay $\Delta t1$ may be defined as the time when the first control signal CTRL1 is transmitted from the first driver circuit 185a' to a subsequent time when the first control signal is received by the first end 155a' of the first pixel group 150a'.

In operation, the electrical distance from the first row driver circuit 185a' to the first end 155a' of the first pixel group 150a' is assumed to be equal to the electrical distance from the first row driver circuit 185a' to the first end 155b' of the second pixel group 150b'. Accordingly, the first time delay $\Delta t1$ may represent the delay between the time when the first control signal CTRL1 is transmitted from the first driver circuit 185a' and a subsequent time when the first control signal is received by the first ends, 155a', 155b' of the first and second pixel groups 150a', 150b', respectively.

The first delay measurement circuit 190a' may be further configured to send the measured first time delay $\Delta t1$ to the row control circuit 145'. Accordingly, the row control circuit 145' may be configured to adjust the timing of release/transmission of a subsequent first control signal to the first driver circuit 185a' according to the measured first time delay $\Delta t1$. The timing of the first driver circuit 185a' may be adjusted in any suitable manner. For example, the row control circuit 145' may transmit the subsequent first control signal, wherein the subsequent first control signal is shifted ahead in time with respect to the first control signal by an amount equal to the measured first time delay.

Similarly, the second delay measurement circuit 190b' may be responsive to the second control signal CTRL2. The second delay measurement circuit 190b' may be configured to measure a second time delay $\Delta t2$, wherein the second time delay $\Delta t2$ may be defined as the time when the second control signal CTRL2 is transmitted from the second row driver circuit 185b' to a subsequent time when the second control signal CTRL2 is received by the second end 160b' of the second pixel group 150b'.

In operation, the electrical distance from the second row driver circuit 185b' to the second end 160b' of the second pixel group 150b' is assumed to be equal to the electrical distance from the second row driver circuit 185b' to the second end 160a' of the first pixel group 150a'. Accordingly, the second time delay Δt2 may represent the delay between the time when the second control signal CTRL2 is transmitted from the second driver circuit 185b' and a subsequent time when the second control signal is received by the second ends, 160a', 160b' of the first and second pixel groups 150a', 150b', respectively.

The second delay measurement circuit 190b' may be further configured to send the measured second time delay Δt2 to the row control circuit 145'. Accordingly, the row control circuit 145' may be configured to adjust the timing of release/transmission of a subsequent second control signal to the second driver circuit 185b' according to the measured second time delay Δt2. The timing of the second driver circuit 185b' may be adjusted in any suitable manner. For example, the row control circuit 145' may transmit the subsequent second control signal, wherein the subsequent second control signal is shifted ahead in time with respect to the second control signal by an amount equal to the measured second time delay.

Figure 7:
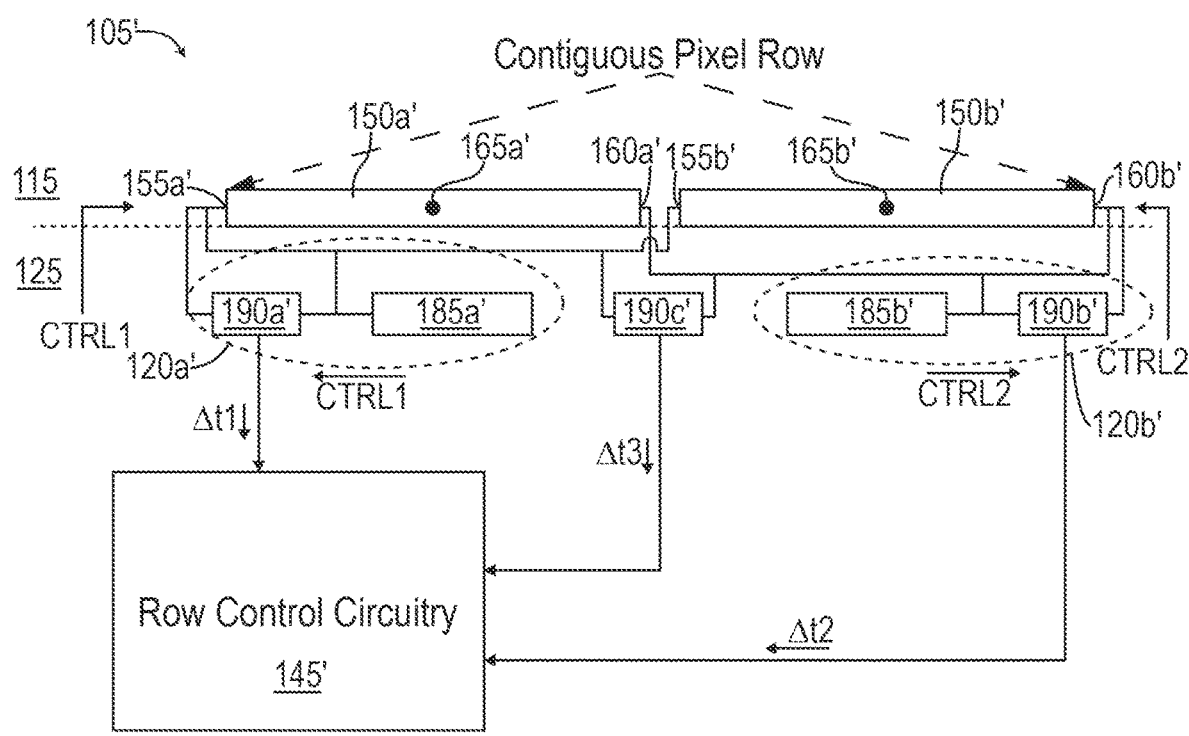
FIG. 7 representatively illustrates a portion of the image sensor in accordance with a third embodiment of the present technology.
Figure 12:
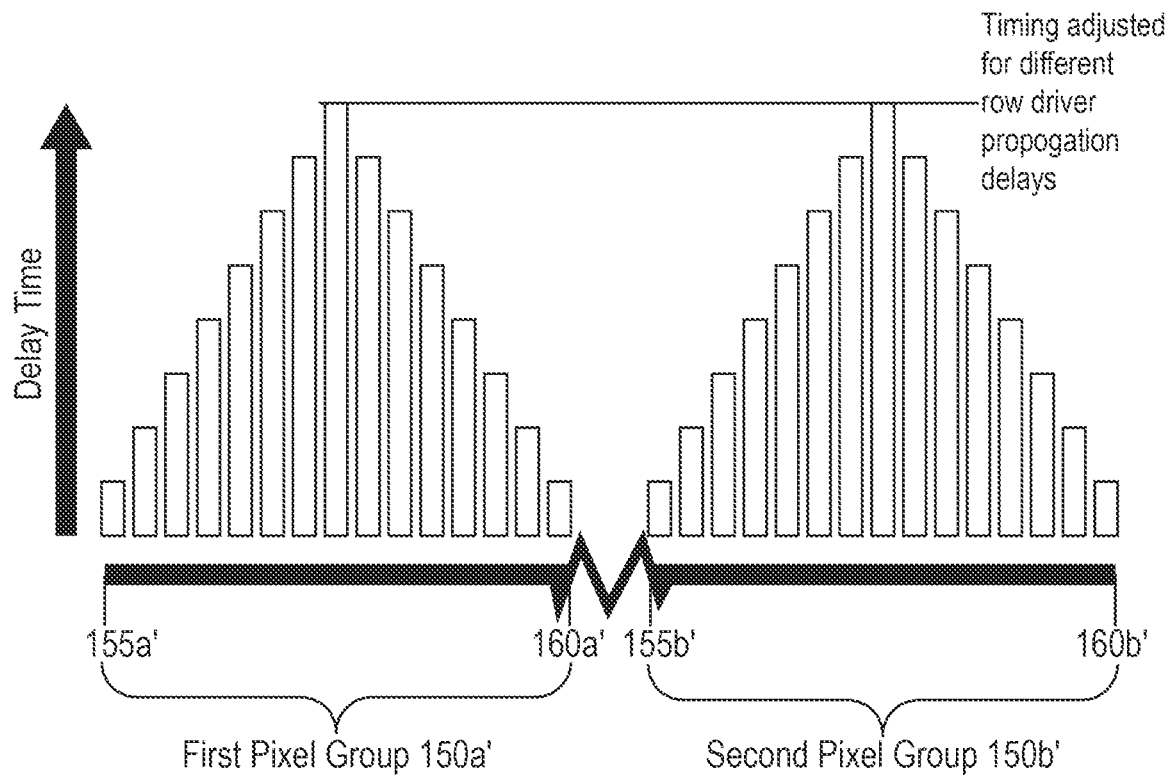
FIG. 12 is a graph showing a time delay of each pixel in the image sensor in accordance with an embodiment of the present technology with offset correction.

According to a third embodiment of the present technology, following the previous example and now referring to FIGS. 7 and 12, the image sensor 105' may further comprise a control circuit 120c' comprising a third delay measurement circuit 190c'. The third delay measurement circuit 190c' may be coupled to the second end 160a' of the first pixel group 150a' and the first end 155b' of the second pixel group 150b'. The third delay measurement circuit 190c' may be configured to receive control signals from the first and second driver circuits 185a', 185b'. The third delay measurement circuit 190c' may be configured to measure a third time delay Δt3, wherein the third time delay Δt3 may be defined as the time the first end 155b' of the second pixel group 150b' receives the first control signal to time the second end 160a' of the first pixel group 150a' receives the second control signal. The third delay measurement circuit 190c' may be further configured to send the third measured time delay Δt3 to the row control circuit 145'. The row control circuit 145' may use the measured third time delay Δt3 along with the measured first and second time delays Δt1, Δt2 to adjust the timing of the operation of the driver circuits 185a', 185b' such that the first and second row driver circuits 185a', 185b' deliver the first and second control signals to each pixel group 150a', 150b' at substantially the same time.

For instance, the row control circuit 145' may transmit subsequent first and second control signals, wherein the subsequent first and second control signals are shifted in time with respect to each other by an amount equal to the measured third time delay. If the first time delay is greater than the second time delay, then the subsequent first control signal may be shifted ahead in time with respect to the subsequent second control signal by an amount equal to the measured third time delay. Similarly, if the first time delay is less than the second time delay, then the subsequent second control signal may be shifted ahead in time with respect to the subsequent first control signal by an amount equal to the measured third time delay. For example, as shown in FIG. 12, a pixel located at the second end 160a' of the first pixel group 150a' and a pixel located at the first end 155b' of the second pixel group 150b' may receive the second control signal and the first control signal, respectively, substantially simultaneously.

It will be appreciated that modifications may be made to the manner in which the control circuit 120a' is connected to the pixel groups 150a', 150b'. For example, in one embodiment, the first row driver circuit 185a' may be connected to the first end 155a' of the first pixel group 150a' and the second end 160a' of the first pixel group 150a'. Accordingly, the first row driver circuit 185a' may be configured to deliver the first control signal to the first and second ends 155a', 160a' of the first pixel group 150a' Similarly, the second row driver circuit 185b' may be connected to the first end 155b' of the second pixel group 150b' and the second end 160b' of the second pixel group 150b'. Accordingly, the second row driver circuit 185b' may be configured to deliver the second control signal to the first and second ends 155b', 160b' of the second pixel group 150b'.

It will also be appreciated that, in an alternative embodiment, the first row driver circuit 185a' may be connected only to a center point 165a' of the first pixel group 150a' instead of the first ends 155a', 155b' of the first and second pixel groups 150a', 150b', respectively. Similarly, the second row driver circuit 185b' may be connected only to a center point 165b' of the second pixel group 150b' instead of the second ends 160a', 160b' of the first and second pixel groups 150a', 150b', respectively. Accordingly, the first and second row driver circuits 185a', 185b' may deliver the first and second control signals to the center points 165a', 165b', respectively.

Figure 10:
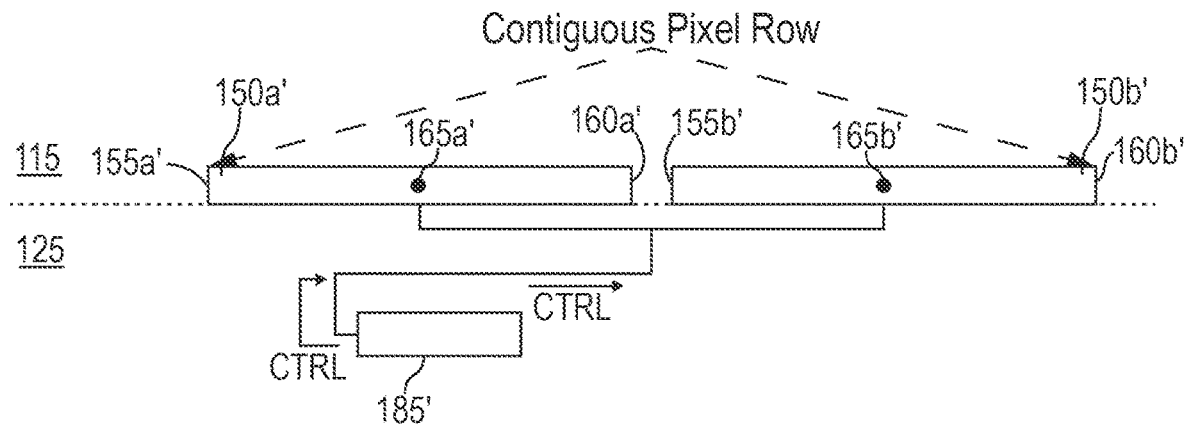
FIG. 10 representatively illustrates a portion of the image sensor in accordance with a fourth embodiment of the present technology.
Figure 13:
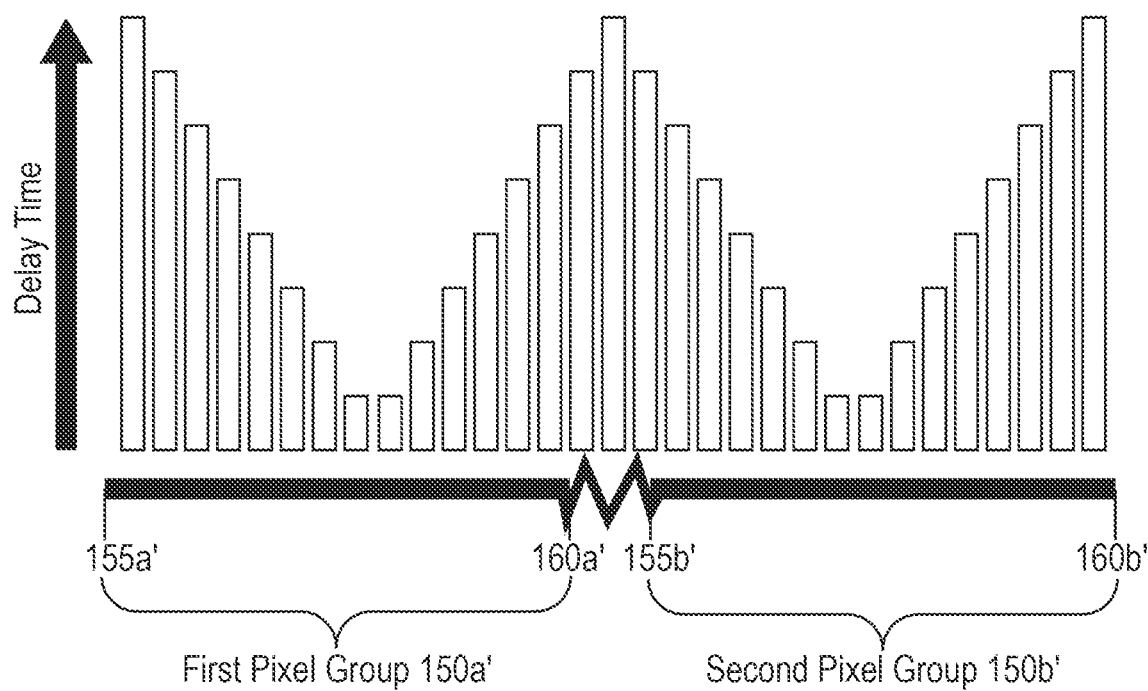
FIG. 13 is a graph showing a time delay of each pixel in the image sensor in accordance with the fourth embodiment of the present technology.

In yet another embodiment, and now referring to FIGS. 10 and 13, each pixel group 150a', 150b' in one row may be controlled by a single driver circuit 185'. In the present case, the single driver circuit 185' may be connected to center points 165a', 165b' of the first and second pixel groups 150a', 150b', respectively. The single driver circuit 185' may deliver the control signal CTRL to each center point 165a', 165b' at substantially the same time. FIG. 13 illustrates the timing of receipt of the control signal for each pixel in the first and second pixel groups 150a', 150b' of FIG. 10, and illustrates that when the single driver circuit 185' delivers the control signal CTRL to each center point 165a', 165b' substantially simultaneously, the pixels near the ends of each pixel group will also receive the control signal CTRL substantially simultaneously.

It will be appreciated that the single driver circuit 185a' may control two or more different pixel groups 150 that share a common row of the pixel array 110. It will also be appreciated that each row of the pixel array 110 may comprise a respective one of the delay measurement circuits 190, where each delay measurement circuit 190 may be situated below one of the pixel groups 150 of its respective row. It will be further appreciated that the single driver circuit 185a' may be connected to the center point 165 of one pixel group 150 and the first end 155 and/or the second end 160 of another pixel group 150. In some embodiments, the single driver circuit 185a' may be connected to the center point 165 of one pixel group 150 and the first end 155 and/or the second end 160 of the same pixel group 150. In other embodiments, the single driver circuit 185a' may be connected to both the first end 155 and the second end 160 of one or more of the pixel groups 150.

Referring to FIGS. 1 to 13, the image sensor 105 may operate according to the system clock signal, CLK, and various control signals, such as the control signal CTRL (also referred to as a readout signal). In an exemplary embodiment, the image sensor 105 may read out the pixels in each pixel group 150 to the readout circuitry 140 according to the control signal CTRL. For example, the row control circuit 145 may transmit the control signal CTRL to the control circuit 120 via the signal control line 175. The driver circuit 185 may receive the control signal CTRL from the row control circuit 145 and may, in turn, drive (transmit) the control signal CTRL to the pixel array 110 through the electrically conductive paths 200 and the pixel control lines 170. However, due to the RC-dominated signal delays introduced by the conductive paths 200, the control signal CTRL may not reach the input of each pixel group 150 at substantially the same time.

The delay measurement circuit 190 may receive the control signal CTRL from the driver circuit 185 at the first input, via the first signal line 183. The control signal CTRL may continue propagating across the conductive paths 200 towards the input of each pixel group 150. The input of the pixel group may be located at the first end 155, the second end 160, or the center point 165 of the respective pixel group. Once the control signal CTRL reaches the input of at least one of the pixel groups 150 at a later time, the control signal CTRL may be fed back from the input of the pixel group 150 to the second input of the delay measurement circuit 190, via the second signal line 184. The delay measurement circuit 190 may count or otherwise measure the time delay between receiving the control signal CTRL at the first input and receiving the control signal CTRL at the second input. The time delay represents the delay between the transmission of the control signal CTRL from the driver circuit 185 and the receipt of the control signal CTRL by at least one of the pixel groups 150. The delay measurement circuit 190 may then transmit the measured time delay to the row control circuit 145.

In response to receiving the measured time delay from the delay measurement circuit 190, the row control circuit 145, which may comprise the logic circuitry 205, may transmit a subsequent control signal CTRL to the driver circuit 185 according to the measured time delay. Each row of the pixel array 110 may be configured to receive a respective control signal CTRL. The logic circuitry 205 may shift the subsequent control signal CTRL ahead in time with respect to the previous control signal CTRL by an amount equal to the measured time delay, such that the elapsed time between the leading edge of the subsequent control signal CTRL that triggers the row driver circuit 185 to drive the subsequent control signal CTRL to the pixel groups 150 and the time at which the same leading edge eventually is input to each pixel group 150, is minimized. Accordingly, the subsequent control signal CTRL will reach the input of each pixel group 150 in its respective row of the pixel array 110 at substantially the same time since the previously-measured time delay was accounted for and effectively cancelled. Once the pixels in the respective row have been read out, a new subsequent control signal CTRL may be transmitted from the row control circuit 145 to the driver circuit 185 and the cycle may repeat until all of the pixels in the pixel array 110 have been read out. The readout process ends once all of the pixels in a given pixel array 110 have been read out.

The time period between the start and end of the pixel readout is referred to as a row readout period, $T_{row}$. Accordingly, the row readout period, $T_{row}$, may be substantially the same for all pixels that share a common pixel row. In various embodiments, the length of the row readout period, $T_{row}$, may be selected according to a particular application, desired operating mode, the size of the pixel array, and the like.

Figure 8:
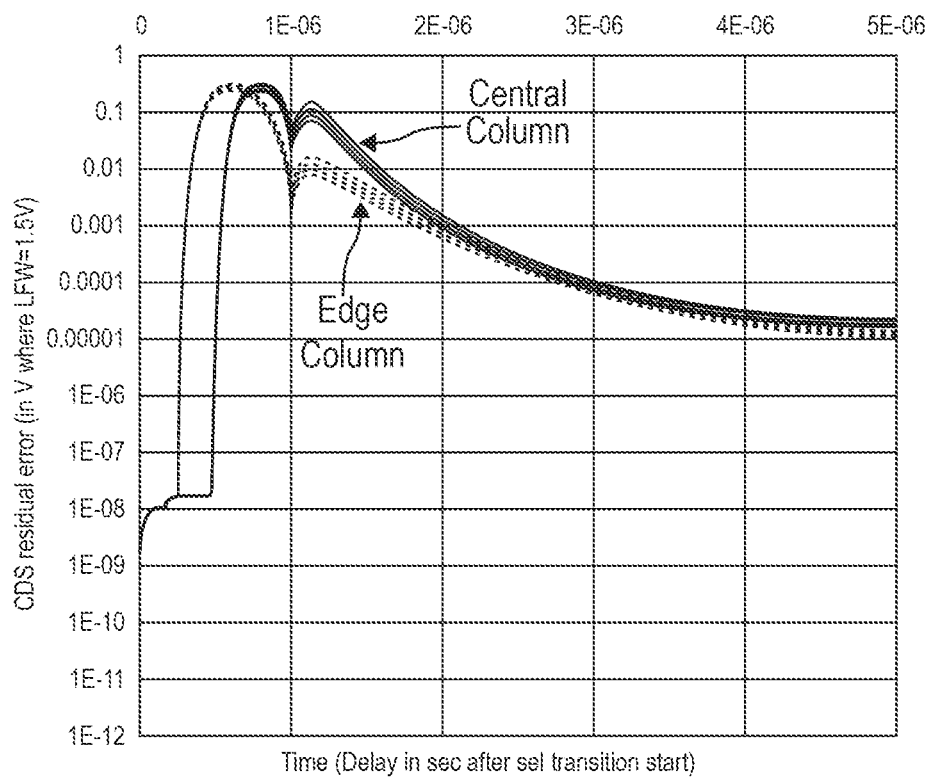
FIG. 8 is a graph showing a time delay in a conventional image sensor.

For example, and referring to FIG. 8, a conventional system will experience time delays between the time when a control signal (i.e., the readout signal) is input to the outer edge of a conventional pixel array and a subsequent time when the signal reaches the middle of the same pixel array. In the case of a particular pixel array having 14,000 rows and 24,000 columns (i.e., m=14 k, and n=24 k) where the signal "time-delays" are simulated, there is a delay of approximately 0.2 microseconds between the time when the signal is input to the outer edge of the pixel array and a subsequent time when the signal reaches the middle of the pixel array.

Figure 9:
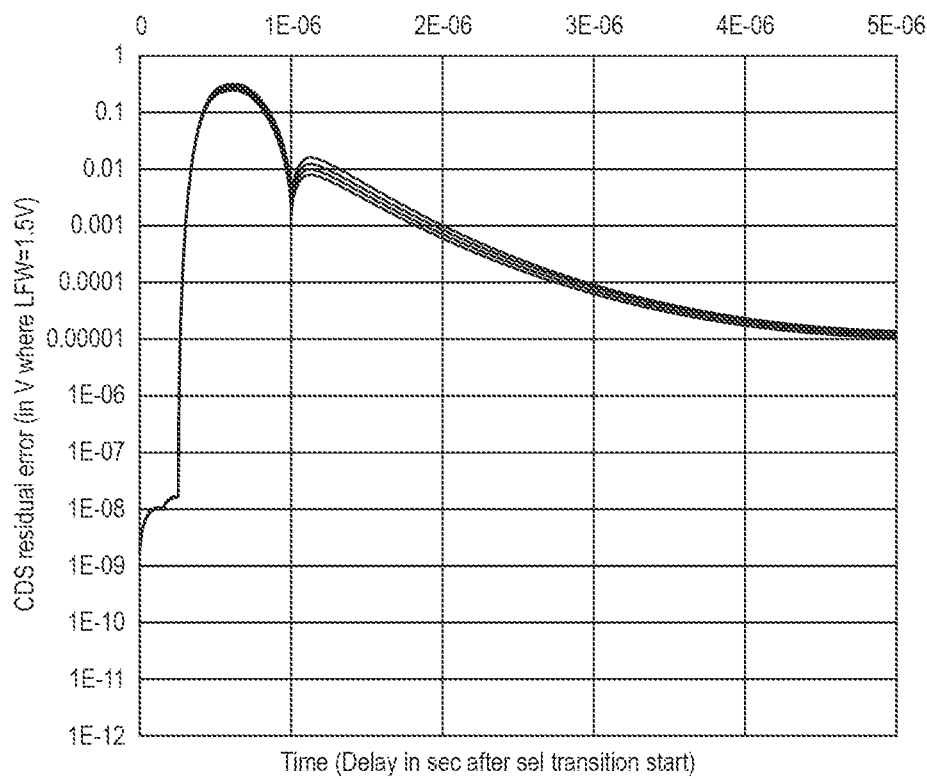
FIG. 9 is a graph showing a time delay in the image sensor in accordance with an embodiment of the present technology.

In contrast, and referring to FIG. 9, embodiments of the present technology do not experience the same delays between the time when the signal (i.e., the readout signal) is input to the outer edge of a pixel array in accordance with an embodiment of the present technology and a subsequent time when the signal reaches the middle of the pixel array. In the present example, each row of the pixel array comprises two pixel groups and there is a negligible delay between the time when the signal is input to the outer edge of the pixel array and a subsequent time when the signal reaches the middle of the pixel array.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configurations recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

What is claimed is:

1. An image sensor, comprising:
a pixel array comprising a plurality of rows, wherein a first row comprises a first pixel group and a second pixel group, wherein the first pixel group has first and second opposing ends, and wherein the second pixel group has first and second opposing ends;
a first row driver circuit connected to the first end of the first pixel group;
a second row driver circuit connected to the second end of the second pixel group;
a first delay measurement circuit that has a first input connected directly to the first row driver circuit and a second input connected directly to a first node that is interposed between the first end of the first pixel group and the first row driver circuit; and
a second delay measurement circuit that has a first input connected directly to the second row driver circuit and a second input connected directly to a second node that is interposed between the second end of the second pixel group and the second row driver circuit.

2. The image sensor defined in claim 1, further comprising a third delay measurement circuit that has a first input connected directly to the first end of the second pixel group and a second input connected directly to the second end of the first pixel group.

3. The image sensor defined in claim 2, wherein the first delay measurement circuit is configured to:
measure a first time delay between a transmission of a first control signal from the first row driver circuit and a receipt of the first control signal at the first node; and
transmit the measured first time delay to a row control circuit.

4. The image sensor defined in claim 3, wherein the second delay measurement circuit is configured to:
measure a second time delay between a transmission of a second control signal from the second row driver and a receipt of the second control signal at the second node; and
transmit the measured second time delay to the row control circuit.

5. The image sensor defined in claim 2, wherein:
the pixel array is formed on a first die; and
the first row driver circuit and the second row driver circuit are formed on a second die.

6. The image sensor defined in claim 5, wherein the first row driver circuit is situated directly below the first pixel group and wherein the second row driver is situated directly below the second pixel group.

7. The image sensor defined in claim 6, wherein the first, second, and third delay measurement circuits are formed on the second die.

8. The image sensor defined in claim 5, wherein the first and second delay measurement circuits are formed on the second die.

9. The image sensor defined in claim 1, wherein the first row has a total number of pixels and wherein the first and second pixel groups each include, within the first row, more than one pixel but less than the total number of pixels.

10. The image sensor defined in claim 1, wherein the first row driver circuit is also connected to the first end of the second pixel group and wherein the second row driver circuit is also connected to the second end of the first pixel group.

11. The image sensor defined in claim 1, wherein the second end of the first pixel group is interposed between the first end of the first pixel group and the second pixel group and wherein the first end of the second pixel group is interposed between the second end of the second pixel group and the first pixel group.

12. An image sensor, comprising:
a pixel array comprising a plurality of rows, wherein a first row comprises a first pixel group and a second pixel group, wherein the first pixel group has first and second opposing ends, and wherein the second pixel group has first and second opposing ends;
a first row driver circuit connected to the first end of the first pixel group;
a second row driver circuit connected to the second end of the second pixel group; and
a delay measurement circuit connected to the first end of the second pixel group and the second end of the first pixel group, wherein the delay measurement circuit is configured to measure a time delay between the first end of the second pixel group receiving a first control signal from the first row driver circuit and the second end of the first pixel group receiving a second control signal from the second row driver circuit.

13. An image sensor, comprising:
a pixel array comprising a plurality of rows, wherein a first row comprises a first pixel group and a second pixel group, wherein the first pixel group has a first center point, and wherein the second pixel group has a second center point;
one or more row driver circuits connected directly to only the first center point and the second center point, wherein the one or more row driver circuits comprises a first row driver circuit connected directly to only the first center point; and
a first delay measurement circuit connected to the first row driver circuit and the first pixel group.

14. The image sensor defined in claim 13, wherein the one or more row driver circuits is configured to deliver a control signal to both the first center point and the second center point.

15. The image sensor defined in claim 13, wherein the first row has a total number of pixels and wherein the first and second pixel groups each include, within the first row, more than one pixel but less than the total number of pixels.

16. The image sensor defined in claim 13, wherein:
the pixel array is formed on a first die;
the one or more row driver circuits is formed on a second die; and
the first and second dies are coupled to form a vertical stack.

17. The image sensor defined in claim 13, wherein the one or more row driver circuits comprises:
  a second row driver circuit connected directly to only the second center point.

18. The image sensor defined in claim 17, further comprising:
  a second delay measurement circuit connected to the second row driver circuit and the second pixel group.

19. The image sensor defined in claim 18, wherein the one or more row driver circuits includes logic circuitry responsive to a system clock signal and a time delay signal from the first delay measurement circuit or the second delay measurement circuit.

20. The image sensor defined in claim 13, wherein the one or more row driver circuits includes logic circuitry responsive to a system clock signal and a time delay signal from the first delay measurement circuit.

\* \* \* \* \*